US007019249B2

(12) United States Patent
Barbezat et al.

(10) Patent No.: US 7,019,249 B2
(45) Date of Patent: Mar. 28, 2006

(54) METHOD AND AN APPARATUS FOR ARC SPRAYING

(75) Inventors: Gérard Barbezat, Opfikon (CH); Christian Warnecke, Wehr (DE)

(73) Assignee: Sulzer Metco AG, Wohlen (CH)

( * ) Notice: Subject to any disclaimer, the term of this patent is extended or adjusted under 35 U.S.C. 154(b) by 282 days.

(21) Appl. No.: 10/402,290

(22) Filed: Mar. 26, 2003

(65) Prior Publication Data

US 2003/0201251 A1 Oct. 30, 2003

(30) Foreign Application Priority Data

Apr. 29, 2002 (EP) .................................. 02405350

(51) Int. Cl.
*B23K 9/04* (2006.01)

(52) U.S. Cl. .................................... 219/76.14; 427/449

(58) Field of Classification Search ............. 219/76.14, 219/76.12; 427/449, 450
See application file for complete search history.

(56) References Cited

U.S. PATENT DOCUMENTS 4,762,977 A 8/1988 Browning
5,206,059 A * 4/1993 Marantz .................. 219/76.14
5,442,153 A 8/1995 Marantz et al.
2002/0074422 A1* 6/2002 Tudor et al. .................. 239/83

FOREIGN PATENT DOCUMENTS

EP 0282310 A2 9/1958
EP 0361710 A1 4/1990
JP 63121648 5/1988

* cited by examiner

*Primary Examiner*—Clifford C. Shaw
(74) *Attorney, Agent, or Firm*—Townsend and Townsend and Crew LLP

(57) ABSTRACT

A method is proposed for arc spraying by means of a spray gun (1). The spray gun includes two electrically conductive spray wires (2) and at least one first supply device (3) for supplying a fluid (4), with an electrical voltage being applied to the spray wires (2), the spray wires (2) being fed by means of a wire guide (5), an arc (6) being ignited by the electrical voltage, the spray wires (2) being converted into a melt (8) in a melting region (7) and the melt (8) being applied by the fluid (4) to the surface (9) of a body (10). In this connection, particles (11) from a storage container (12) are supplied to the melt (8) by the fluid (4).

13 Claims, 3 Drawing Sheets

METHOD AND AN APPARATUS FOR ARC SPRAYING

BACKGROUND OF THE INVENTION

The invention relates to a method of arc spraying, and to an apparatus for arc spraying.

Arc spraying, frequently also more accurately called arc wire thermal spraying in the technical literature, is a conventional technology for the manufacture of surface coatings on workpieces which should be protected, for example, against mechanical wear, corrosion or against chemical or thermal strains.

With arc spraying, a wire-like or tube-like spray medium in the form of two spray wires is melted in an electrical arc using a spray gun and sprayed onto a workpiece surface by an atomizing gas, e.g. by nitrogen, a noble gas or simply by air, under a pre-settable pressure. In this connection, the arc is initiated between the two ends of the spray wires by application of an electrical voltage and contact ignition. This is different from so-called "flame spraying", a method in which the thermal energy to melt the spray wire is applied by a combustible gas/oxygen flame, whereas in arc spraying, the electrical energy released in the arc supplies the required thermal energy to melt the spray wires.

Since the material of the spray wires is converted into the melt in the region of the arc and is sprayed onto the surface of the material, the spray wire must be continuously fed from a wire store by a wire feed. Depending on the application, stationary spray guns are known which are frequently used in automated operation for the processing of large series, but also relatively small hand spray guns can be used which allow a more flexible employment. The device for the wire feed can here be either installed in the spray gun itself or, however, be effected by a wire feed unit lying outside the spray gun.

In this connection, the properties of the sprayed layers can be directly influenced by different parameters such as the wire diameter, the material of the spray wire, the speed of the wire feed, the electrical voltage for the generation of the arc or the electrical current for the maintaining of the arc, the selection of the atomizing gas and its working pressure or the spray distance. That is, as a rule, a change of one or more of these parameters (or also of other parameters not named here) will result in layers with different properties and quality. Since the previously named parameters can generally be easily influenced by a selection of the materials or by electronic control and/or regulation devices, the arc spraying is characterized by high flexibility. For example, among other things, the spray droplet size, or the kinetic energy of the spray droplet, can easily be set automatically, or also during an on-going coating procedure, depending on the demand. Moreover, the spray procedure itself can take place under a normal ambient atmosphere, in a vacuum chamber or in an insert gas environment. A wide selection of the most varied workpieces with the most varied demands on properties and quality can thereby be provided with protective surfaces using the method of arc spraying.

A disadvantage of the known methods of arc spraying can be seen in the fact that quite specific demands are to be made on the wire materials which come into question for the manufacture of the spray wires. For instance the spray wires must have a sufficient ductility, that is, a sufficiently high deformability and/or elasticity and a sufficiently high conductivity. If components with electrically poor conductivity or no conductivity or relatively hard, that is, less ductile, components such as ceramic materials should also be introduced into a layer to be sprayed, so-called filler wires must be made use of. Filler wires are understood to be spray wires with which additional components, usually in the form of discrete particles, are included in the base material of the spray wire, which do not melt or only start to melt in the arc, and are also installed in the surface layer sprayed on. In this connection, the particles are very limited in their volumes and can partly already be changed in their structure by the melting procedure of the spray wire, which frequently results in undesired modifications in the layer. The volume portion of the particles in the melt can also practically not be changed in a controlled manner since it is fixedly predetermined by the distribution of the particles in the filler wire. The size, shape and type of the particles can also only be changed by replacing the filler wire and thus not be changed during the spray procedure itself. In addition, electrically non-conductive particles in the spray wire can disturb the stability of the arc and thus influence the quality of the sprayed surface layer in a substantially negative manner. Furthermore, the manufacture of filler wires is correspondingly complex and expensive in comparison with usual spray wires.

SUMMARY OF THE INVENTION

It is therefore an object of the invention to propose a method of arc spraying by means of a spray gun which allows additional solid particles, in particular particles with electrically poor conductivity or no conductivity and/or less ductile particles, to be introduced into the melt produced from the base material of the spray wires in a controlled manner such that the stability of the arc is not impaired and the use of filler wires can be omitted. It is further an object of the invention to propose a corresponding apparatus for arc spraying with a spray gun.

In accordance with the invention, a method of arc spraying is thus proposed by means of a spray gun which includes two electrically conductive spray wires and at least one first supply device for the supply of a fluid, with an electrical voltage being applied to the spray wires, the spray wires being fed by means of a wire guide, an arc being ignited by the electrical voltage, the spray wires being converted into a melt in a melting range and the melt being applied onto the surface of a body by the fluid. In this connection, particles from a storage container are supplied to the melt by the fluid. Additional particles can be introduced into the melt, and thus into the surface layer to be produced by using the method in accordance with the invention, and the use of filler wires can be dispensed with.

In a preferred embodiment, an apparatus having a spray gun known per se is used for the carrying out of the method of arc spraying in accordance with the invention. The apparatus for arc spraying includes a spray pistol, a wire guide for supplying two spray wires, a gas supply which makes available a fluid, preferably a gaseous fluid under an adjustable working pressure, an energy source which is suitable to supply the spray wires with electrical energy, and a freely programmable control unit for the setting of different process parameters. The spray wires are supplied from a storage device to a wire guide which includes a wire feed and a guide device. The wire feed, which can be accommodated either in the spray gun itself or in an external device, transports the spray wires from the storage device via the guide device into a melting region such that an arc ignites between both spray wires in the melting region and can be kept stable over a pre-settable time. The guide device is preferably designed such that it can be connected as an electrically conductive device to the energy source and is electrically conductively in contact with the spray wire such that the electrical energy required for the production of the arc can be supplied to the spray wire via the guide device. The guide device can also be electrically insulated against the spray wires, with the electrical energy then being supplied to the spray wires in another manner. Since the material of the spray wire is converted into a melt continuously in the melting region with arc spraying, the spray wire must be continuously fed to the melting region by the wire guide to maintain the arc.

The gas supply is connected via a first supply device, which can be designed, for example, in the form of a pressure line, to the melting region such that the melt produced by the arc in the melting region from the material of the spray wire is acted upon by the fluid with an adjustable working pressure and is thus applied to the surface of a workpiece to be coated, with the fluid preferably being able to include a gas, in particular a noble gas such as helium or argon, or an inert gas such as nitrogen or also oxygen or ambient air.

The apparatus in accordance with the invention for arc spraying additionally has—in comparison with the prior art—a storage container which, in a preferred embodiment of the apparatus in accordance with the invention, is in connection with the first supply device by suitable means such that solid particles can be supplied to the fluid. The melt is thereby acted upon by the fluid flow, which includes the fluid and the supplied solid particles, via the first feed device with an adjustable working pressure such that the particles are supplied to the melt and are applied to the surface of a body to be coated together with the smelt formed from the spray wires. It is further possible for the particles from different storage containers to be able to be supplied to the melt such that the number and the kind of the materials supplied to the fluid in the form of particles can be set in a controlled manner during the spray procedure. It is furthermore possible for the storage container and the gas supply to be formed by a common container.

In another preferred embodiment of an apparatus for arc spraying in accordance with a method in accordance with the invention, the particles are supplied to the melt by the fluid by means of a second supply device. In this connection, the apparatus includes in the same manner and function the already described components, in particular also the first supply device which, however, optionally only serves to act on the melt produced by the arc in the melting region from the material of the spray wire by the fluid with an adjustable working pressure and so to apply the melt to the surface of a workpiece to be coated.

This apparatus for arc spraying thus has—additionally to the first supply device—a second supply device to which second supply device particles from a storage container can be supplied by means of a fluid, with also two or more storage containers being present. The storage containers are connected to a gas supply which makes fluid available at a pre-settable working pressure for the transport of the particles, with the same gas supply being in connection both with the first supply device and with the storage container. However, two or more gas supplies can also be present so that, for example, the first feed device, on the one hand, and the storage containers, on the other hand, can be supplied with fluid from different gas supplies. If a plurality of gas supplies are present, different fluids can also be used at the same time in one spray process. It is thus possible, for example, for the melt to be acted upon with working pressure with a first gas, e.g. oxygen, from a gas supply through the first supply device, while the particles acted upon from another gas supply with a second gas, for example by a noble gas, with another working pressure, are supplied to the melt via the second supply device. Depending on requirements, different fluids from the gases mentioned here by way of example can also be considered. If a plurality of storage containers are present which make available the same or different particles, each storage container can also be fed from one or more gas supplies which can make available the same or different fluids.

In this connection, the particles from the storage container are supplied to the melt by the fluid by means of the second supply device such that the particles are mixed with the melt in the melting region and are applied to the surface of the body by the fluid together with the melt and thus become an integral component of the surface layer. The second supply device preferably includes a nozzle device which is suitable to introduce the particles into the melt acted upon by the fluid with working pressure.

It is also possible for particles to be supplied simultaneously to the melt via the first supply device and via the second supply device, with an apparatus for arc spraying in accordance with the invention furthermore being quite able to include further supply devices in addition to the first supply device and the second supply device.

In this connection, the apparatus in accordance with the invention for arc spraying preferably includes, as already mentioned, a freely programmable control unit which allows different process parameters such as the working pressure of the fluid and/or the supplied amount or type of particles and/or the wire feed and/or further process parameters to be set individually according to a pre-settable scheme.

The particles from the storage container supplied to the fluid can include, in a preferred embodiment, a ceramic material and/or a carbide and/or a boride and/or a nitride, in particular hexagonal boric nitride (hBN) or cubic boric nitride (cBN) and/or a metal and/or a metal alloy. The size of the particles lies between 1 μm and 200 μm and is preferably selected between 5 μm and 80 μm. The volume portion of the particles from the storage container, which are supplied to the fluid, can be set variably or fixedly such that the volume portion of the particles in the layer sprayed by the method in accordance with the invention amounts to between 0.1% and 40% of the total volume of the surface layer applied. The volume portion of the particles in the sprayed surface layer preferably lies between 1% and 20%.

The apparatus in accordance with the invention can in this connection have a plurality of storage containers with different types of particles, with the particles, which can be made up of different materials and/or can be of different size, being supplied to the fluid from the different storage containers and the composition of the particle flow being changed continuously by the control unit in accordance with a pre-settable scheme. It is thereby possible also to adapt both the structure and the composition of the surface layer to be sprayed continuously during a spray process, whereby workpieces with highly structured surfaces can also always be ideally coated in all surface regions.

A particular advantage of the method in accordance with the invention for arc spraying consists of the fact that the particles are introduced into the melt with the fluid and are not brought into the coating process by using a filler wire. The particles are thereby much less restricted in their volume and have no negative effects on the stability of the arc and of the melting process. Depending on the materials used and/or on the parameters selected for the arc spraying, the particles introduced into the melt can already be either fully or partly surrounded by the fusible phase, for example inside small droplets which have formed during the atomizing of the melt, during its path to the surface of the body to be coated, or only be surrounded by the fusible phase on the surface of the body to be coated before or during the solidifying during the layer formation.

In a particular variant of the method in accordance with the invention, the particles for example include oxidic ceramic materials or carbides and are substantially not melted in the spray process, but installed, in a matrix-like manner in the sprayed surface layer, in a carrier layer which is largely made up of the material of the spray wire. The surface layer thus created can, depending on the kind of particles built in, have quite different properties. In comparison with surface layers which were manufactured with known methods for arc spraying, a much improved wear resistance of the sprayed surfaces can be achieved, for example, by the use of hard ceramic particles. For example, wear protection layers for brake discs can be manufactured by the method in accordance with the invention which can be used, among other things, in vehicles whose brake discs are constantly under high strain due to frequent braking processes. This applies, for example, to trucks, streetcars, buses and other vehicles, in particular in local traffic, which have to brake relatively large masses frequently and at short intervals. Due to the use of the method in accordance with the invention, wear protection layers can for the first time be sprayed onto the brake discs of such vehicles which even survive the service life of the corresponding vehicle. The economic advantages which result from the use of such wear protective layers are obvious. In this connection, the method in accordance with the invention is not restricted to the manufacture of wear protection layers for brake discs, but can, for example, also be used successfully for the coating of smooth cylinders or Yankee and/or crepe cylinders (so-called dryer cylinders) for the manufacture of paper in the paper-making industry or in many other sectors. In addition to protective layers on surfaces of workpieces, even free-standing bodies of MMC (metal matrix composite) can be sprayed.

It is furthermore possible for the particles to be substantially dry lubricants such as hexagonal boric nitride (hBN) or other materials, whereby an increased lubricating capability and/or improved abrasive properties of the surface can be achieved. For example, movable components in turbines of all kind, which are exposed to high temperatures and/or high mechanical strains and have certain sealing functions, can thus be equipped with such layers by using the method in accordance with the invention.

It is moreover even possible for the particles likewise to be melted in the arc such that a more or less homogeneous mixture of melt and melted particles is formed, which then results in correspondingly more homogeneous structures in the surface layer. For example, the particles, which are supplied to the fluid from the storage container, can include materials such as metals or metal alloys. By supplying such particles into the melt formed from the material of the spray wire, an alloy can, for example, be formed in the melt which has a composition differing from the material of the spray wire or having properties different from the material of the spray wire.

The properties of the sprayed surface layer can moreover also be influenced by the fluid itself which is used in the spraying process to apply working pressure to the melt and/or for the supply of the particles. For example, the fluid can include an increased content of oxygen such that the materials including the melt and/or the particles already oxidize to a certain degree in the spray process, whereby the chemical and physical properties of the sprayed surface can be positively influenced.

The apparatus in accordance with the invention for arc spraying with a spray gun includes a wire guide for feeding two electrically conductive spray wires and at least one first supply device for the supply of a fluid, with an electrical voltage being applied to the spray wires such that an arc can be ignited and thereby the spray wires can be converted in a melting region into a melt, with the melt being applied to the surface of a body by the fluid. In this connection, means are provided at the apparatus in accordance with the invention to supply particles from a storage container to the melt by the fluid.

Since means are provided to supply particles to the melt by the fluid, the use of filler wires as spray wires can be omitted. Different sorts of particles can be supplied to the fluid either separately from a plurality of different storage containers or mixtures of different sorts of particles are available in one or more storage containers and can be supplied to the fluid from the storage containers.

The invention will be described in more detail in the following with reference to the drawing.

DESCRIPTION OF THE PREFERRED EMBODIMENTS

Figure 1:
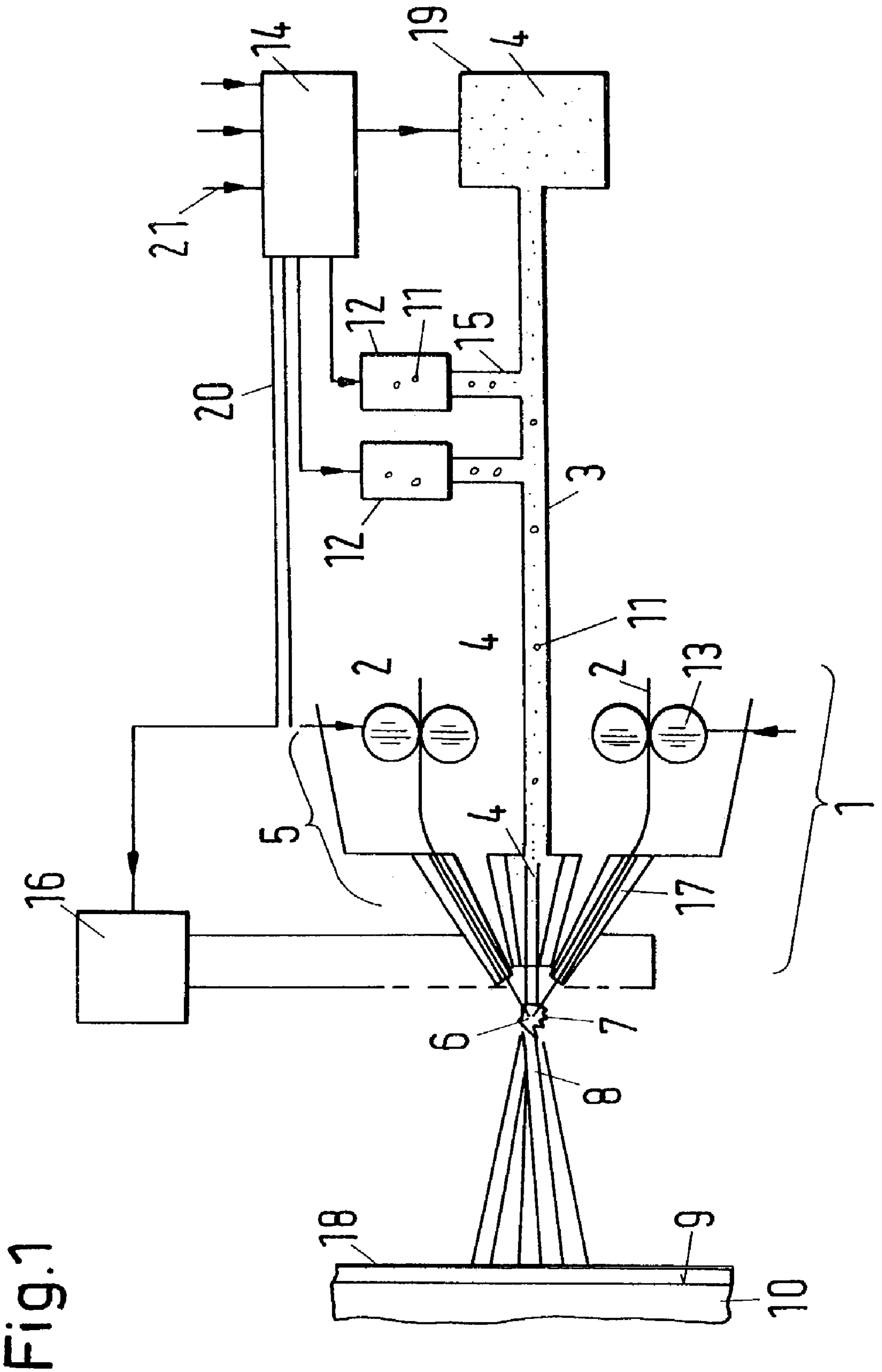
FIG. 1 illustrates the important parts of an embodiment of an apparatus for arc spraying in accordance with the invention.

FIG. 1 shows in a schematic representation a preferred embodiment of an apparatus in accordance with the invention for arc spraying comprising a spray gun 1, a first supply device 3, a storage container 12 and a control unit 14 for arc spraying in accordance with a method in accordance with the invention. The spray gun 1 includes, in a known manner, two electrically conductive spray wires 2 which are connected to an energy source 16 for supply with electrical energy such that an arc 6 can be ignited between the spray wires 2 in a melting region 7 and can be maintained in a stable manner over a pre-settable time. The spray wires 2 can be supplied from a storage device (not shown) of a wire guide 5. The wire guide 5 includes a wire feed 13 which is suitable to supply the spray wire 2 to the melting region 7 through a guide device 17. The guide device 17 is preferably designed such that it can be connected as an electrically conductive device to the energy source 16 and is in electrically conductive contact with the spray wire 2 such that the electrical energy required for the production of the arc 6 can be supplied to the spray wire 2 via the guide device 17. Since material of the spray wire 2 is continually converted into a melt 8 in the melting region 7 in arc spraying, the spray wire 2 must be continuously fed to the melting region 7 by the wire guide 5 to maintain the arc 6.

The melt 8 formed from the material of the spray wire 2 in the arc 6 is applied to a surface 9 of a body 10 by a fluid 4 via a first supply device 3 from a gas supply 19. The melt 8 is acted upon with a pre-settable pressure by the fluid 4, which is preferably a gas, in particular oxygen, nitrogen, argon, helium, ambient air or another gas, whereby the melt 8 is propelled onto the surface 9 of the body 10, and the melt 8 condenses into a solid state on the surface 9 of the body 10 and thus forms a surface layer 18 with pre-settable properties on the surface 9 of the body 10.

An apparatus in accordance with the invention for arc spraying furthermore has means 15 with which particles 11 can be supplied to the fluid 4 from a storage container 12, with—as shown by way of example in FIG. 1—also two or more storage containers 12 being present. In this connection, the particles 11 from the storage container 12 are supplied to the melt 8 by the fluid 4 such that the particles 11 are mixed with the melt 8 in the melting region 7 and are applied to the surface 9 of the body 10 together with the melt 8 by the fluid 4 and thus become an integral part of the surface layer 18. The particles 11 preferably include a ceramic material, in particular aluminum oxide ($Al_2O_3$), chromium oxide ($Cr_2O_3$), titanium oxide ($TiO_2$), zirconium oxide ($ZrO_2$) and/or a carbide, in particular tungsten carbide (WC), chromium carbide ($Cr_3C_2$), titanium carbide (TiC), tantalum carbide (TaC), iron carbide ($Fe_3C$), niobium carbide, vanadium carbide and/or a boride and/or a nitride such as hexagonal boric nitride (hBN) or cubic boric nitride (cBN) and/or a metal and/or a metal alloy. In this connection, the particles 11 are preferably substantially not melted, but only integrated into the surface 18 in a matrix-like structure. However, it is also conceivable for the particles 11 likewise to be melted and to be mixed with the melt 8, e.g. while forming an alloy, in order thus to form a substantially homogeneous surface layer 18.

For control and/or regulation, an apparatus in accordance with the invention for arc spraying has a freely programmable control unit 14 with which the working pressure, with which the fluid 4 acts upon the melt 8, and/or the supplied amount and/or kind of particles 11 and/or the wire feed 13 and/or the electrical energy supplied to the spray wires 2 and/or a further process parameter can be set individually. For this purpose, for example, the gas supply 19 and/or the wire guide 5 and/or the storage container 12 and/or the energy source 16 and/or further components of the apparatus in accordance with the invention are connected to the control unit 14 via control lines 20. Furthermore, the control unit 14 can include sensor lines 21 by which different operating parameters such as current working pressure, gas pressure in the process chamber, ambient pressure, temperature, electrical operating parameters of the energy source, or other parameters, can be transmitted to the control unit 14 by sensors (not shown).

Figure 2:
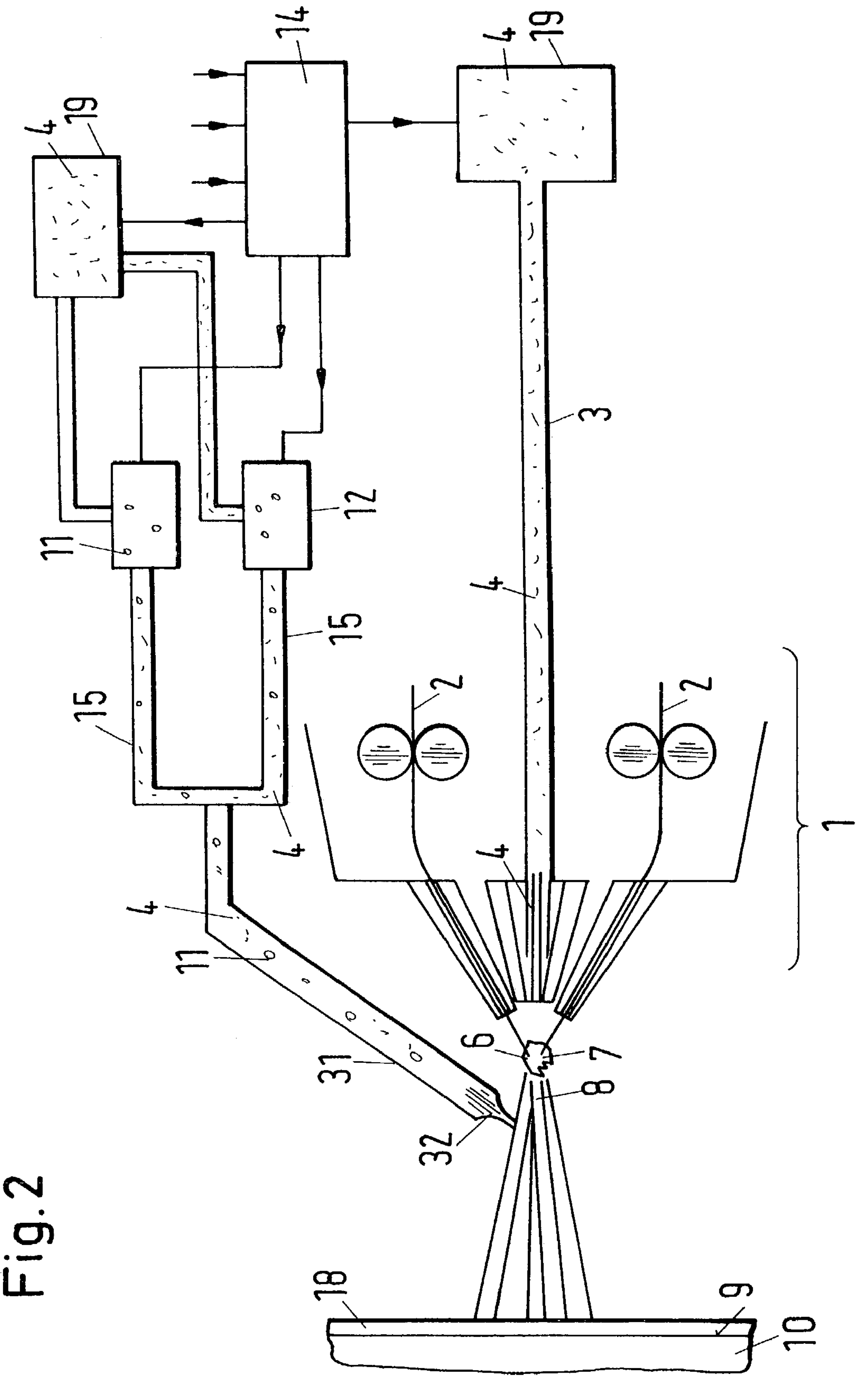
FIG. 2 shows a further embodiment of an apparatus for arc spraying.

FIG. 2 schematically shows a further embodiment of an apparatus for arc spraying in accordance with a method of the invention having a spray gun 1, a first supply device 3, a storage container 12 and a control unit 14. In the embodiment shown here, the particles 11 are, however, supplied to the melt 8 by the fluid 4 by means of a second supply device 31, with the spray gun 1 including in the same manner and function the already described known components of a spray gun 1 for arc spraying. The apparatus shown in FIG. 2 also includes, likewise in the same manner and function, the already described further components of an apparatus in accordance with the operation, with the first supply device 3 optionally only being able to serve for the supply of fluid 4 to act upon the melt 8 with working pressure. The apparatus shown in FIG. 2 in particular also has an energy source 16 whose representation has been omitted here for reasons of understandability.

The melt 8 formed from the material of the spray wire 2 in the arc 6 is also applied here—analogously to the already described embodiment—to a surface 9 of a body 10 by a fluid 4 via a supply device 3 from a gas supply 19. The melt 8 is acted upon with a pre-settable working pressure by the fluid 4 which is preferably a gas, in particular nitrogen, oxygen, argon, helium, ambient air or another gas, whereby the melt 8 is propelled onto the surface 9 of the body 10, and the melt 8 condenses on the surface 9 of the body 10 in a solid state and thus forms a surface layer 18 with pre-settable properties on the surface 9 of the body 10.

The embodiment shown in FIG. 2 of an apparatus in accordance with the invention for arc spraying further has means 15 with which particles 11 can be supplied from a storage container 12 of a second supply device 31 by means of a fluid 4, with—as shown by way of example in FIG. 2—also two or more storage containers 12 being present. The storage containers 12 are connected to a gas supply 19 which makes fluid 4 available at a pre-settable working pressure for the transport of the particles 11. In this connection, the same gas supply 19 can be in connection both with the first supply device 3 and with the storage container 12 and/or the second supply device 31. However, as shown by way of example in FIG. 2, two or more gas supplies 19 can also be present so that, for example, the first supply device 3 and the storage containers 12 and/or the second supply device 31 are supplied with fluid 4 from different gas supplies 19. If a plurality of gas supplies 19 are present, different fluids can also be employed simultaneously in one spray process. It is thus possible, for example, for the melt 8 to be acted upon by oxygen with working pressure through the first supply device 3 from a gas supply 19, while the particles 11, for example acted upon by a noble gas with a different working pressure, are supplied to the melt 8 from another gas supply 19 via the second supply device 31. Depending on the demand, fluids 4 can also be considered other than the gases listed here by way of example. If a plurality of storage containers 12 are present which can make available the same or different particles 11, each storage container can also be fed from one or more gas supplies 19 which can make available the same or different fluids 4.

In this connection, the particles 11 from the storage container 12 are supplied to the melt 8 by the fluid 4 by means of the second supply device 31 such that the particles 11 are mixed with the melt 8 in the melting region 7 and are applied to the surface 9 of the body 10 by the fluid 4 together with the melt 8 and thus become an integral part of the surface layer 18. The second supply device 31 preferably includes a nozzle device 32 which is suitable to introduce the particles 11 into the melt acted upon with working pressure by the fluid 4.

Figure 3:
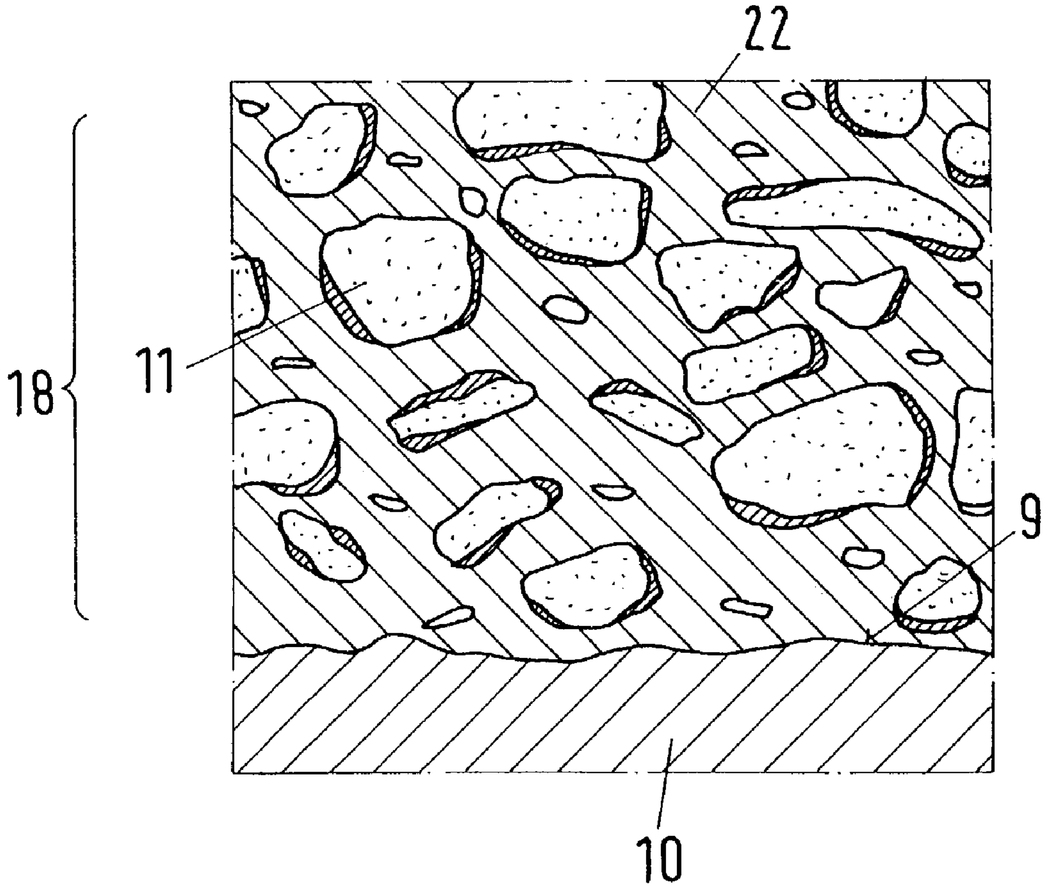
FIG. 3 shows an example of a layer on a surface of a body, applied by arc spraying in accordance with the method of the present invention.

FIG. 3 shows—in a schematic representation—an example of a surface layer 18 which was applied to the surface 9 of a body 10 by arc spraying in accordance with a method of the invention. With the example shown here, particles 11 from the storage container 12 are supplied to the fluid 4 acted upon with working pressure and the melt 8 formed in the arc 6 is propelled onto the surface 9 of the body 10 by the particle flow formed from the fluid 4 and the particles 11. The particles 11 used in this embodiment were, in this connection, substantially not melted, but installed in a matrix-like manner in a carrier layer 22 which largely includes the material of the spray wire 2 (from the material melted by the arc 6). The surface layer 18 thus created can, for example, depending on the kind of the particles 11 built in, have a much improved wear resistance in comparison with surface layers 18 which were made with known methods for arc spraying.

For example, surface layers 18 for brake discs can thus be manufactured by the method in accordance with the invention which can be used, among other things, in vehicles whose brake discs are constantly under high strain due to frequent braking processes. This applies, among other things, to trucks, streetcars, buses and other vehicles, in particular in local traffic, which have to brake relatively large masses frequently and at short intervals. In this connection, the method in accordance with the invention is not restricted to the manufacture of surface layers 18 for brake discs, but can, for example, also be used successfully for the coating of smooth cylinders or Yankee and/or crepe cylinders (so-called dryer cylinders) for the manufacture of paper in the paper-making industry or in many other sectors. In addition to surface layers 18 on surfaces 9 of workpieces, even free-standing bodies of MMC (metal matrix composite) can be sprayed.

It is further possible for the particles 11 to substantially include dry lubricants such as hexagonal boric nitride or others, whereby an increased lubrication capability and/or improved abrasive properties of the surface layer 18 are achieved. It is also possible for the particles 11 likewise to be melted in the arc 6 such that a more or less homogeneous mixture of melt 8 and melted particles 11 is formed, which then results in correspondingly more homogeneous structures in the surface layer 18.

Since the supply of the particles 11 to the melt 8 can take place from different storage containers 12 and the amount and/or kind of supplied particles 11 can be set individually for each storage container 12, it is also possible to manufacture surface layers 18 in one working step whose properties vary over the surface layer 18 from point to point and/or over the thickness of the surface layer 18; i.e. pre-settable concentration profiles of particles can also be produced in the surface layer 18. It is thus possible, for example, to manufacture surface layers 18 whose abrasive properties and/or whose wear resistance vary from point to point or change in a pre-settable manner as the layer removal increases.

The method in accordance with the invention for arc spraying by means of a spray gun allows solid particles to be additionally introduced into the melt produced from the material of the spray wires in a controlled manner by a fluid acted upon with working pressure such that the use of expensive filler wires can be omitted. Since the particles are supplied from different storage containers to the melt by the fluid in accordance with a pre-settable scheme, as required, different particle types of different size and chemical composition can be simultaneously introduced into the layer to be sprayed. It thereby becomes possible to manufacture surface layers with clearly improved properties and a greater variety of possible structures and composition by arc spraying.

The invention claimed is:

1. A method of arc spraying by means of a spray gun which includes two electrically conductive spray wires and at least one first supply device for supplying a fluid to a melt of the spray wires, with an electrical voltage being applied to the spray wires, the spray wires being fed by means of a wire guide, an arc being ignited by the electrical voltage, the spray wires being converted into the melt in a melting region, and the melt being applied by the fluid to a surface of a body, characterized in that particles from a storage container are supplied to the melt by fluid from a second supply device, and in that the electrical arc supplies substantially all the heat required for forming the melt and applying the melt and the particles to the surface.

2. A method in accordance with claim 1, in which the fluid acts upon the melt with an adjustable working pressure.

3. A method in accordance with claim 1, in which the fluid includes a gas, in particular a noble gas such as helium or argon, or nitrogen or oxygen.

4. A method in accordance with claim 1, in which the particles include a ceramic material, in particular Al2O3, Cr2O3, TiO2, ZrO2 and/or a carbide, in particular WC, Cr3C2, TiC, TaC, Fe3C, diamond niobium carbide, vanadium carbide and/or a boride and/or a nitride, in particular cBN or hBN, and/or a metal and/or a metal alloy.

5. A method in accordance with claim 1, in which the size of the particles is selected to be between 1 μm and 200 μm, preferably between 5 μm and 80 μm.

6. A method in accordance claim 1, in which the wire guide includes a controllable or regulatable wire feed.

7. A method in accordance with claim 1, in which the working pressure of the fluid and/or the supplied amount and/or kind of particles and/or the wire feed and/or any desired further process parameter can be set individually by means of a freely programmable control unit.

8. A method in accordance with claim 1, in which particles of different materials and/or particles of different size are supplied to the fluid from different storage containers to change the composition of the particle flow.

9. A wear part, in particular a brake disc for a vehicle, or smooth or Yankee or crepe cylinders for paper making, which was coated in accordance with a method in accordance with claim 1.

10. An apparatus for arc spraying comprising a spray gun which includes a wire guide for feeding two electrically conductive spray wires and a first supply device for supplying a fluid, a source of heat defined solely by an electrical voltage to be applied to said spray wires such that an arc can be ignited and thereby the spray wires can be converted into a melt in a melting region, with the melt being applied to the surface of a body by the fluid, characterized by a second supply device supplying particles from a storage container into the melt.

11. A method of arc spraying a material layer onto a surface of a body comprising advancing electrically conductive first and second spray wires towards a melt region, directing a first fluid flow towards the melt region, entraining particles to be included in the material layer in a second fluid flow, applying sufficient electric energy to the spray wires to heat the melt region sufficiently for melting portions of the spray wires, transporting the molten portions with the first fluid flow towards the surface of the body, combining the first and second fluid flows at the melt region, and directing the combined fluid flows, including the particles and the molten portions of the spray wires entrained therein, towards the surface of the body to thereby form the layer.

12. An arc spraying method comprising feeding first and second consumable electrodes towards a melt region, at the melt region generating an electric current between the electrodes to generate substantially all the heat required for arc spraying, directing a first fluid flow to the melt region, entraining particles in a second fluid flow, heating the first fluid flow at the melt region with heat generated by the electrodes, transporting the molten portions with the first fluid flow towards the surface of the body, combining the first and second fluid flows in a vicinity of the melt region, and directing the combined first and second fluid flows, including entrained particles and molten portions of the spray wires, from the melt region onto a surface to thereby form a layer comprising the molten spray wire portions and the particles entrained in the fluid.

13. Apparatus for arc spraying a material layer onto a surface of a body comprising a feeder for feeding first and second consumable electrodes to a melt region, a conduit for flowing a first fluid to the melt region and in a direction towards the surface of the body, a mixer for entraining particles into a second fluid flow upstream of the melt region, an electric power supply operatively coupled to the first and second electrodes sufficient to supply all of the heat energy required for melting the portions of the consumable electrodes and applying the particles and molten portions as the material layer to the surface of the body, and means for transporting the molten portions with the first fluid flow towards the surface of the body, combining the first and second fluid flows downstream of the melt region, whereby the combined fluid flows carry the entrained particles and molten portions of the consumable electrodes towards the surface of the body to form the material layer comprised from molten portions of the consumable electrodes and the particles.

* * * * *